(12) United States Patent
Livingston et al.

(10) Patent No.: US 10,316,827 B2
(45) Date of Patent: Jun. 11, 2019

(54) CONDUIT ASSEMBLY FOR A LIGHTNING PROTECTION CABLE OF A WIND TURBINE ROTOR BLADE

(71) Applicant: General Electric Company, Schenectady, NY (US)

(72) Inventors: Jamie T. Livingston, Simpsonville, SC (US); Bruce Clark Busbey, Greer, SC (US)

(73) Assignee: General Electric Company, Schenectady, NY (US)

(*) Notice: Subject to any disclaimer, the term of this patent is extended or adjusted under 35 U.S.C. 154(b) by 351 days.

(21) Appl. No.: 14/537,952

(22) Filed: Nov. 11, 2014

(65) Prior Publication Data

US 2016/0131110 A1   May 12, 2016

(51) Int. Cl.
*F03D 80/30* (2016.01)
*F03D 1/06* (2006.01)

(52) U.S. Cl.
CPC ........... *F03D 80/30* (2016.05); *F03D 1/0683* (2013.01); *Y02E 10/721* (2013.01)

(58) Field of Classification Search
CPC ........ F03D 80/30; F03D 1/001; F03D 1/0683; F03D 11/0033; F03D 1/0675; F03D 80/00; Y02E 10/721
See application file for complete search history.

(56) References Cited

U.S. PATENT DOCUMENTS

| | | | |
|---|---|---|---|
| 7,651,320 B2 * | 1/2010 | Hansen | H02G 13/00 416/1 |
| 7,729,100 B2 | 6/2010 | Llorente Gonzalez et al. | |
| 8,081,414 B2 | 12/2011 | Llorente | |
| 8,133,031 B2 | 3/2012 | Arinaga et al. | |
| 8,137,074 B2 | 3/2012 | Mendez Hernandez et al. | |
| 8,622,710 B2 | 1/2014 | Rindt et al. | |
| 8,734,110 B2 | 5/2014 | Kuroiwa et al. | |
| 8,777,579 B2 | 7/2014 | Hancock et al. | |

(Continued)

FOREIGN PATENT DOCUMENTS

| | | |
|---|---|---|
| CN | 201810500 U | 4/2011 |
| CN | 102094768 A | 6/2011 |

(Continued)

OTHER PUBLICATIONS

Anixter, "Wire Wisdom", 2012, retrieved from the internet on Dec. 1, 2016: <URL: https://www.anixter.com/content/dam/Anixter/Wire%20Wisdom/12T0026X00-Anixter-WW-Jacketing-Material-W&C-EN-US.pdf>.*

(Continued)

*Primary Examiner* — Carlos A Rivera
*Assistant Examiner* — Sang K Kim
(74) *Attorney, Agent, or Firm* — Dority & Manning, P.A.

(57) ABSTRACT

The present disclosure is directed to a system and method for reducing electrical arcs caused by lightning strikes in a rotor blade of a wind turbine. The rotor blade includes a lightning protection system with at least one lightning receptor connected to at least one conductor and a conduit assembly. The conduit assembly has one or more conduit members configured to route the conductor of the lightning protection system from a first blade location to a second blade location so as to maximize a distance between the conductor and one or more conductive rotor blade components.

18 Claims, 8 Drawing Sheets

(56) References Cited

U.S. PATENT DOCUMENTS

| | | | | |
|---|---|---|---|---|
| 2008/0095624 A1* | 4/2008 | Lewke | .................... | F03D 80/30 |
| | | | | 416/146 R |
| 2011/0142678 A1* | 6/2011 | Santiago | ............... | F03D 1/0675 |
| | | | | 416/241 R |
| 2011/0189025 A1* | 8/2011 | Hancock | ................. | B25B 11/02 |
| | | | | 416/226 |
| 2012/0269631 A1 | 10/2012 | Lewke | | |
| 2012/0282097 A1 | 11/2012 | Lewke et al. | | |
| 2013/0028739 A1* | 1/2013 | Erichsen | ................ | F03D 80/30 |
| | | | | 416/146 R |
| 2013/0149154 A1 | 6/2013 | Kuroiwa et al. | | |
| 2014/0118177 A1* | 5/2014 | Appleton | ............. | F03D 1/0675 |
| | | | | 342/1 |
| 2014/0119919 A1 | 5/2014 | Naka et al. | | |
| 2014/0301857 A1* | 10/2014 | Richers | .................. | B29C 70/42 |
| | | | | 416/230 |
| 2016/0090968 A1* | 3/2016 | Hansen | .................... | H01Q 1/22 |
| | | | | 416/146 R |

FOREIGN PATENT DOCUMENTS

| | | |
|---|---|---|
| CN | 202012454 U | 10/2011 |
| CN | 202082053 U | 12/2011 |
| CN | 101793240 B | 5/2012 |
| CN | 202431453 U | 9/2012 |
| CN | 103352808 A | 10/2013 |
| DE | 202006000673 U1 | 6/2006 |
| JP | 2009250040 A | 10/2009 |
| WO | 2013091380 A1 | 6/2013 |
| WO | 2013097855 A2 | 7/2013 |
| WO | 2013190288 A1 | 12/2013 |

OTHER PUBLICATIONS

"How are cables used in wind turbines?", Paul Dvorak, Apr. 25, 2013, retrieved from the internet on Aug. 17, 2017; URL: http://www.windpowerengineering.com/design/electrical/cables/how-are-cables-used-in-wind-turbines/.*

"In aircraft wire systems, how much slack shoid I give a wire", Michael Traskos, Jul. 217, 2013, retrieved from the Internet on Aug. 17, 2017; URL: https://www.lectromec.com/in-aircraft-wire-systems-how-much-slack-should-i-give-a-wire/.*

Office Action issued in connection with corresponding DK Application No. PA201570719 dated Aug. 12, 2016.

* cited by examiner

CONDUIT ASSEMBLY FOR A LIGHTNING PROTECTION CABLE OF A WIND TURBINE ROTOR BLADE

FIELD OF THE INVENTION

The field of the invention relates in general to wind turbines, and more particularly to a conduit assembly for a lightning protection cable or wire of a lighting protection system for a wind turbine rotor blade.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Wind turbines, and the blades in particular, are prone to lightning strikes. Thus, modern wind turbines typically include a lightning protection system having one or more lightning receptors disposed on the exterior of the rotor blades and a lightning conductor (e.g. a cable or wire) coupled to the lightning receptor(s) and extending through the rotor blades from a blade tip to the blade root and through other components until grounded down through the tower to a ground location. Accordingly, when lightning strikes the rotor blade, the electrical current may flow through the lightning receptor(s) and may be conducted through the lightning system to the ground.

The lightning conductor is typically attached directly to the blade using fiberglass laminates and bond paste. More specifically, the present routing of the lightning conductor is in the root area of the rotor blade along the inner skin. Components in the rotor blade (e.g. spar caps) that are in close proximity to the conductor may have different voltage potentials, especially in the case of carbon-constructed spar caps. Such components can arc if either the voltage difference is too high or the distance between the components and the conductor is too close.

Thus, an improved system and method of reducing arc events in the rotor blade caused by lightning strikes would be beneficial. More specifically, a system and method that maximizes the distance between the lightning conductor and certain conductive rotor blade components, e.g. carbon spar caps, so as to reduce such arc events would be welcomed in the art.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine rotor blade is provided and includes a root, a tip, and pressure and suction sides extending between the tip and the root. The pressure and suction sides define an internal cavity of the rotor blade. At least one spar cap is engaged with an internal surface of either the pressure or suction sides and at least one shear web is configured with the spar cap. The rotor blade also includes a lightning protection system having one or more conductors (e.g. cables or wires) connecting one or more lightning receptors so as to form a conductive circuit. Thus, the conductive circuit may include terminal ends that extend through the root and connect to a grounding system. A portion of the conductor extends in a span-wise direction along the shear web. In addition, a conduit assembly extends from the shear web to one of the internal surfaces of the pressure and suction sides and routes the conductor from the shear web to a blade location so as to maximize a distance between the conductor and the spar cap.

In one embodiment, the shear web terminates at an edge near the blade root. In such an embodiment, the conduit assembly is configured with the edge of the shear web and extends to one of the internal surfaces of the pressure and suction sides near the root.

In another embodiment, the blade location ranges from about chord-wise 45 degrees to about 180 degrees away from the at least one spar cap. In additional embodiments, the rotor blade may include opposing spar caps, with the at least one shear web extending between the opposing spar caps. In such embodiments, the blade location may range from about chord-wise 45 degrees to about 135 degrees away from the opposing spar caps.

In still further embodiments, the conduit assembly may include one or more conduit members. For example, the conduit members may include any one of or a combination of the following: one or more straight tubes, one or more bent or angled tubes, one or more cover members, one or more flexible couplings, or similar. In addition, the conduit members may be constructed of any one of or combination of the following non-conductive materials: polyvinyl chloride (PVC), polyethylene, polystyrene, polycarbonate, polyester, polypropylene, or similar.

In yet another embodiment, the rotor blade may include a bonding material configured to secure the conduit assembly within the internal cavity of the rotor blade, e.g. to the shear web and/or one of the internal surfaces of the pressure and suction sides. For example, in a particular embodiment, the bonding material may include at least one of a laminate composite material, an adhesive, or similar. More specifically, the laminate composite material may include at least one of a carbon fiber reinforced laminate composite, a glass fiber reinforced laminate composite, or similar.

In another aspect, the present disclosure is directed to a system for reducing electrical arcs caused by lightning strikes in a rotor blade of a wind turbine. The rotor blade includes a lightning protection system with at least one lightning receptor connected to at least one conductor. The system includes a conduit assembly having one or more conduit members. The conduit members are configured to route the conductor of the lightning protection system from a first blade location to a second blade location so as to maximize a distance between the conductor and one or more conductive rotor blade components.

In one embodiment, the first blade location may include an edge of a shear web of the rotor blade and the one or more conductive rotor blade components may include at least one spar cap. Thus, in a particular embodiment, the second blade location may range from about chord-wise 45 degrees to about 180 degrees away from the first blade location.

In yet another aspect, the present disclosure is directed to a method for reducing electrical arcs caused by lightning strikes in a rotor blade of a wind turbine. The method includes installing a lightning protection system for the wind turbine, the lightning protection system having at least one lightning receptor, at least one conductor, and a conduit assembly. Another step includes inserting and securing the conductor within the conduit assembly. The method also includes securing the conduit assembly at a predetermined location within an internal cavity of the rotor blade. Thus, the conduit assembly is configured to route the conductor from a first blade location to a second blade location so as to maximize a distance between the conductor and one or more conductive rotor blade components.

In one embodiment, the predetermined location may include an edge of the shear web near a blade root of the rotor blade, a span-wise location along the shear web near the blade tip, or any other suitable location within the rotor blade that maintains a desired distance between the conductor and any conductive rotor blade components, e.g. carbon spar caps. For example, in one embodiment, the conductive rotor blade components may include opposing spar caps and the distance between the first blade location and the second blade location may range from about chord-wise 45 degrees to about 135 degrees.

In further embodiments, the step of securing the conduit assembly at the predetermined location within the internal cavity of the rotor blade may further include securing one or more ends of the conduit assembly via a bonding material, such as, but not limited to a laminate composite material, an adhesive, or similar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to improved systems and method for reducing electrical arcs caused by lightning strikes in a rotor blade of a wind turbine. More specifically, in one embodiment, the lightning conductor, e.g. a conductive cable or wire, connects a plurality of lightning receptors so as to form a conductive circuit. A conduit assembly having one or more conduit members is configured with at least a portion of the conductor so as to route the conductor from a first blade location (e.g. the shear web) to a second blade location (e.g. an internal surface of the rotor blade) so as to maximize a distance between the conductor and one or more conductive rotor blade components (e.g. the spar caps).

By routing the conductor away from conductive rotor blade components, the present disclosure is configured to reduce the chance of an electrical arc that may damage the rotor blade. Thus, the present disclosure reduces the need for rotor blade repairs, which has the positive effect of increasing total power output of the wind turbine.

Figure 1:
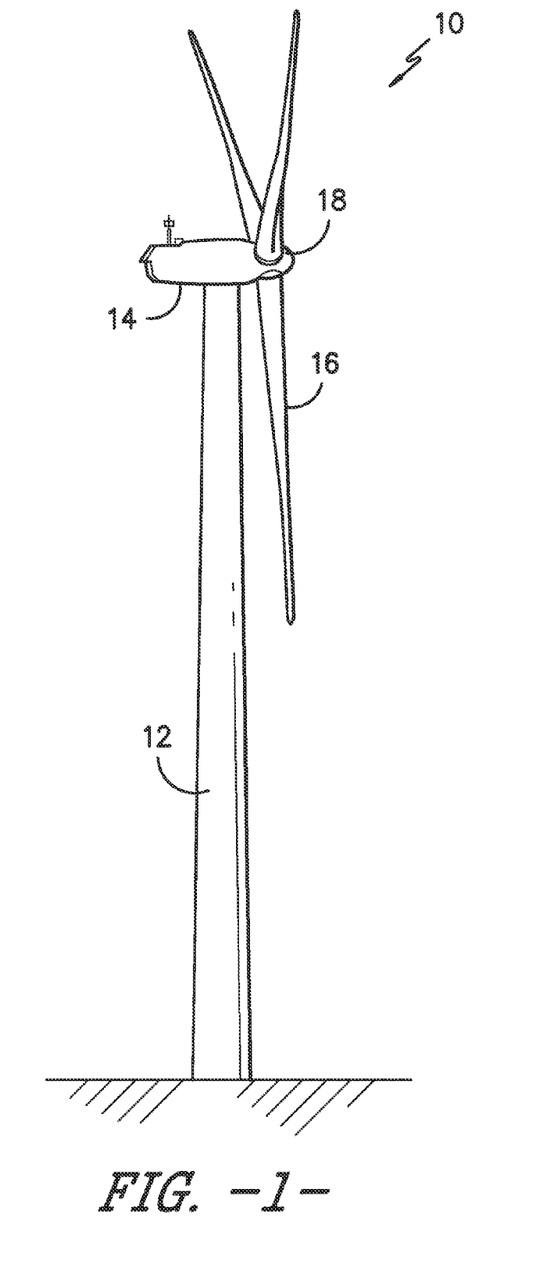
FIG. 1 illustrates a perspective view of a conventional wind turbine.

Referring to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Figure 2:
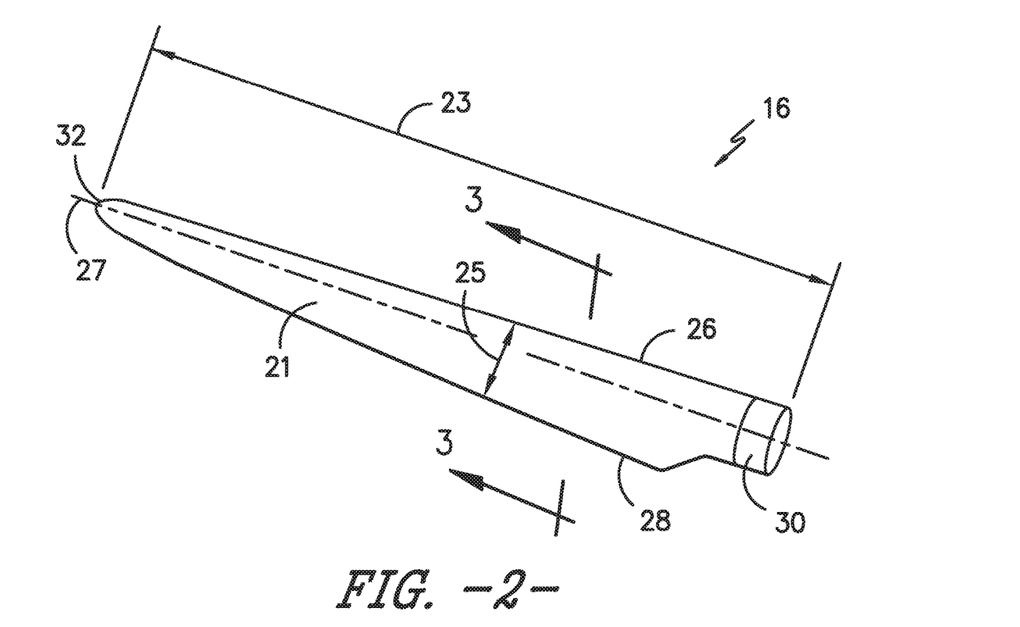
FIG. 2 illustrates a perspective view of a rotor blade according to the present disclosure.
Figure 3:
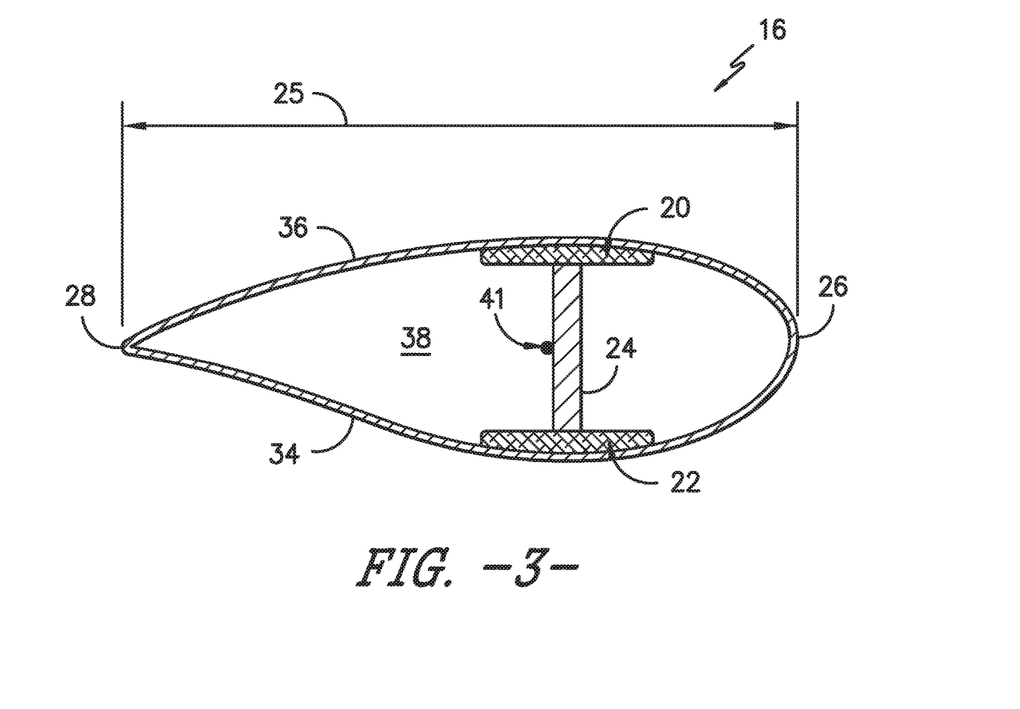
FIG. 3 illustrates a cross-sectional view of the rotor blade of FIG. 2 along line 3-3.

Referring now to FIGS. 2 and 3, one embodiment of a rotor blade 16 for use with a wind turbine 10 is illustrated in accordance with aspects of the present subject matter. In particular, FIG. 2 illustrates a perspective view of one embodiment of the rotor blade 16. FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 20 (FIG. 1) of a wind turbine 10 and a blade tip 32 disposed opposite the blade root 30. A body shell 21 of the rotor blade generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing edges 26, 28 of the rotor blade 16. Further, the rotor blade 16 may also have a span 23 defining the total length between the blade root 30 and the blade tip 32 and a chord 25 defining the total length between the leading edge 26 and the trialing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing edges 26, 28 of the blade 16. Alternatively, the body shell 21 may be constructed of a modular blade configuration.

Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally spanwise direction (a direction parallel to the span 23 of the rotor blade 16) during operation of a wind turbine 10. Similarly, the spar caps 20, 22 may also be designed to withstand the spanwise compression occurring during operation of the wind turbine 10. Further, the spar caps 20, 22 may be constructed of any suitable material so as to withstand the bending stresses and/or other loads acting on the rotor blade 16. For example, in certain embodiments, the spar caps 20, 22 are constructed of a laminate composite, such as a carbon-fiber reinforced laminate composite or a glass-fiber reinforced laminate composite, or similar. FIG. 3 also illustrates a typical location of the conductor 41 configured along the shear web 24 near the blade tip 32 of the rotor blade 16.

Figure 4:
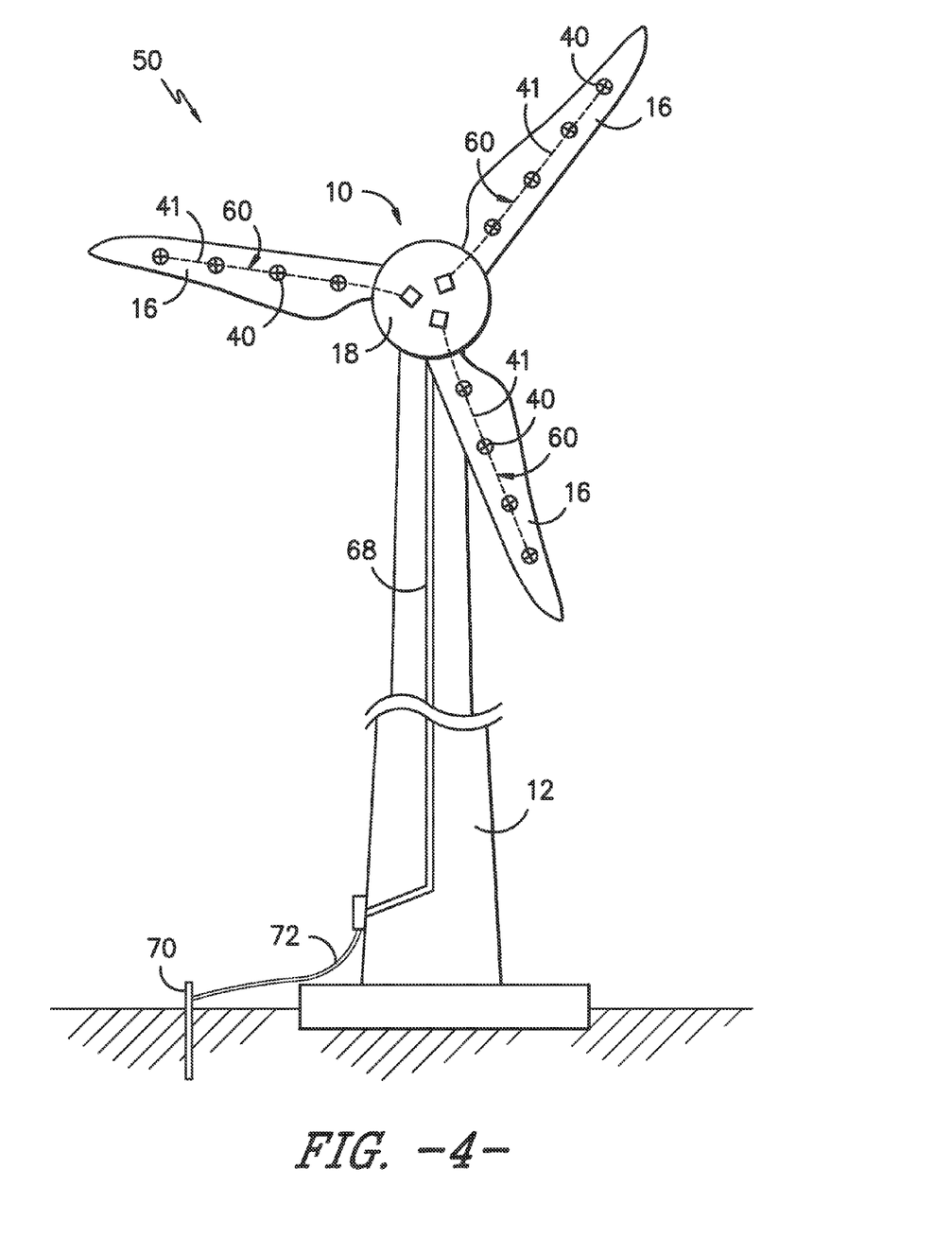
FIG. 4 illustrates a perspective view of one embodiment of a wind turbine, particularly illustrating a lighting protection system configured thereon according to the present disclosure.

Referring now to FIG. 4, a perspective view of one embodiment of a wind turbine 10 having a lightning protection system 50 configured thereon is illustrated. As shown, the lightning protection system 50 includes at least one rotor blade 16 having a plurality of lightning receptors 40 configured along either or both pressure or suction sides 34, 36 of the blade rotor 16. Further, each of the rotor blades 16 is configured in a similar manner. For example, as shown, each rotor blade 16 includes a conductive circuit 60 having a plurality of lightning receptors 40 connected via one or more lightning conductors or conductive wires 41 within the internal cavity 38 of the rotor blade 16. The respective lightning conductive circuits 60 for each of the rotor blades 16 include terminal ends that extend through the root portion of the rotor blades 16 and are individually connected to a grounding system within the rotor hub 18. The grounding system may be variously configured, as is well known in the art. For example, the grounding system may include any conductive path defined by the wind turbine's machinery or support structure, including blade bearings, machinery bed plates, tower structure, and the like, that defines any suitable ground conductive path 68 from the blades 16, through the tower 12, to a ground rod 70 via a ground cable 72, or other suitable electrical ground path.

Figure 5:
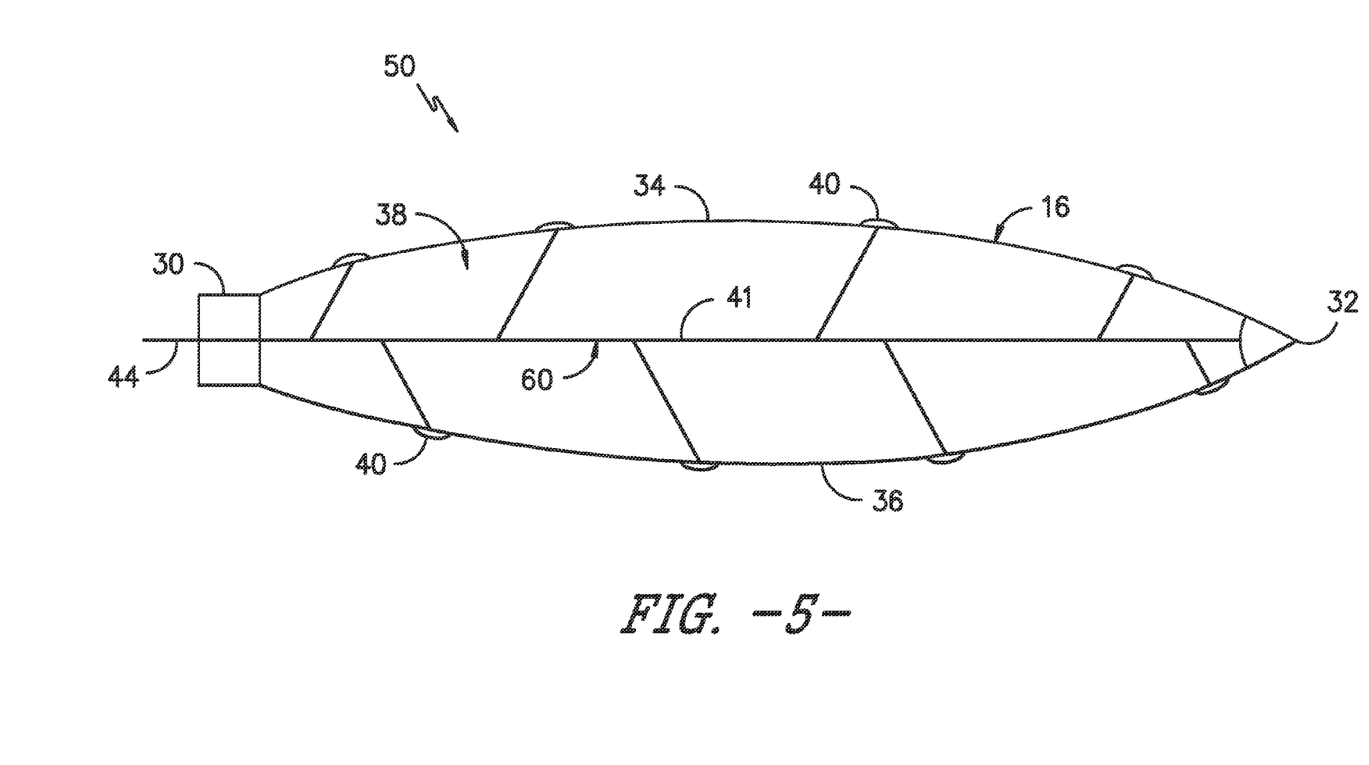
FIG. 5 illustrates a perspective view of one embodiment of a rotor blade, particularly illustrating a plurality of lighting receptors connected by a conductor according to the present disclosure.

Referring now to FIG. 5, a cross-sectional view of one embodiment of a rotor blade 16 having a lightning protection system 50 configured therewith is illustrated. As shown, the conductive circuit 60 includes the lightning receptors 40 connected in series via conductor 41. In various embodiments, the lightning receptors 40 may be configured along either or both of the pressure or suction sides 34, 36. In addition, the lightning receptors 40 may be configured at the blade tip 32 of the rotor blade 16. For example, in the illustrated embodiment, the lightning receptors 40 are provided on each of the pressure and suction sides 34, 36. In an alternative embodiment, the lightning receptors 40 may be provided on only one of the sides 34, 36. It should be understood that the lightning receptors 40 may be variously configured within the scope and spirit of the invention, and may include any metal or metalized component (i.e., a metal screen, a metal rod or tip, and the like) mounted on the pressure or suction sides 34, 36 of the rotor blade 16 for the purpose of conducting lightning strikes to a ground. Further, the conductors 41 may have a gauge suitable for defining a conductive leg for transmitting a lightning strike on any one of the receptors 40 to a ground via connection of the conductive terminal 44 to the wind turbine's ground system.

Still referring to FIG. 5, each rotor blade 16 may include a single conductive circuit 60, as depicted, with each of the lightning receptors 40 configured in parallel within the single circuit 60. In an alternative embodiment, the rotor blade 16 may include a plurality of circuits 60, with each of the lightning receptors 40 configured in one of the respective circuits 60. In still further embodiments, the receptors 40 may be connected in any suitable fashion via the conductor 41 and it should be understood that the embodiment of FIG. 5 is provided for example purposes only and is not intended to be limiting.

Figure 6:
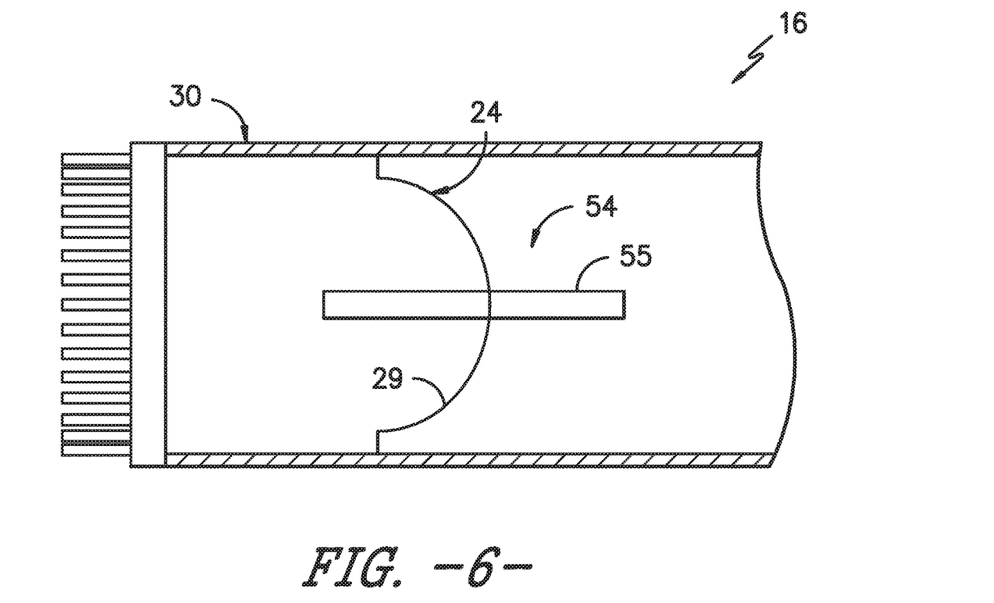
FIG. 6 illustrates a side view of one embodiment of a blade root of a rotor blade, particularly illustrating a conduit assembly configured within the blade root according to the present disclosure.
Figure 7:
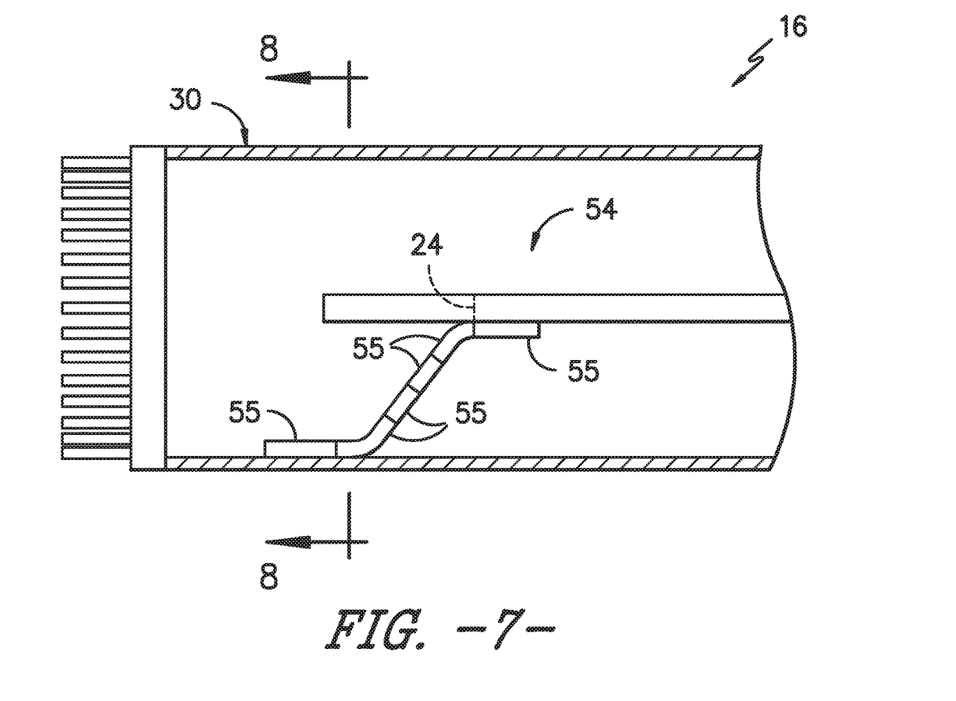
FIG. 7 illustrates a top view of one embodiment of a blade root of a rotor blade, particularly illustrating a conduit assembly configured within the blade root according to the present disclosure.
Figure 8:
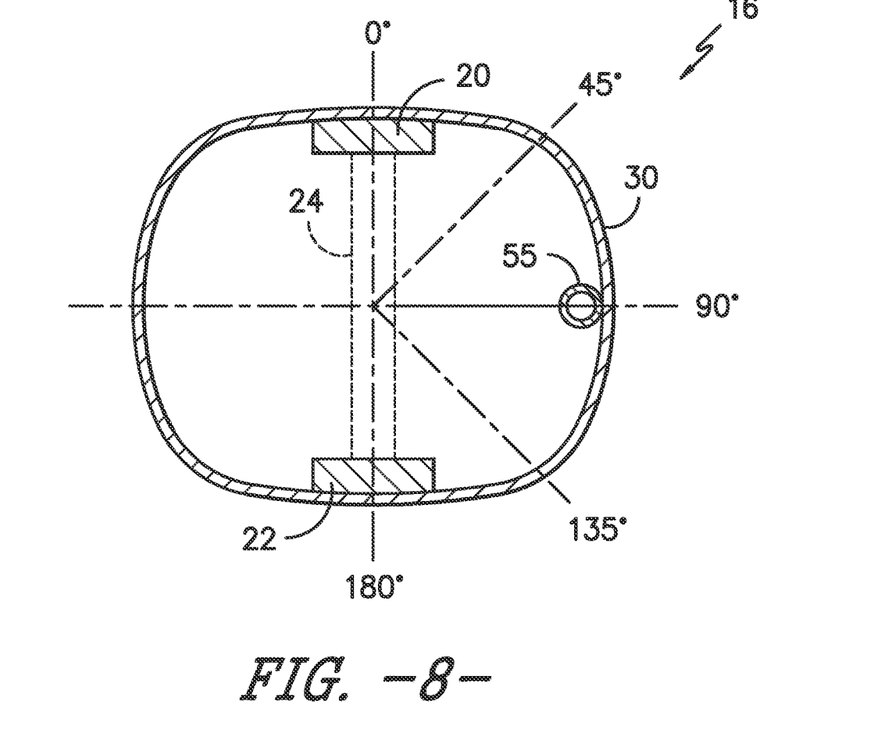
FIG. 8 illustrates a cross-sectional view of the embodiment of FIG. 7 along line 8-8.
Figure 9:
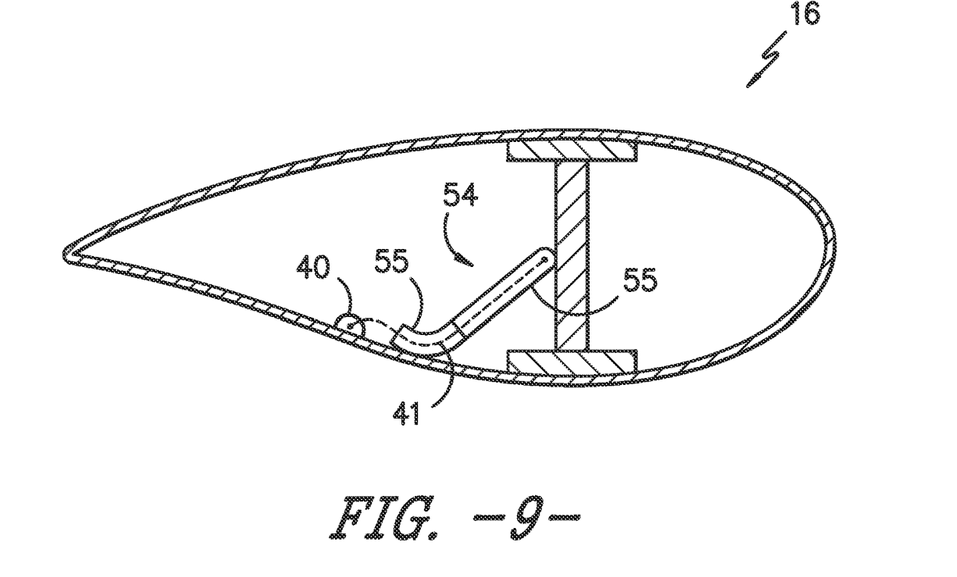
FIG. 9 illustrates an internal view of one embodiment of a rotor blade, particularly illustrating a conduit assembly configured at a span-wise location of the rotor blade according to the present disclosure.
Figure 10:
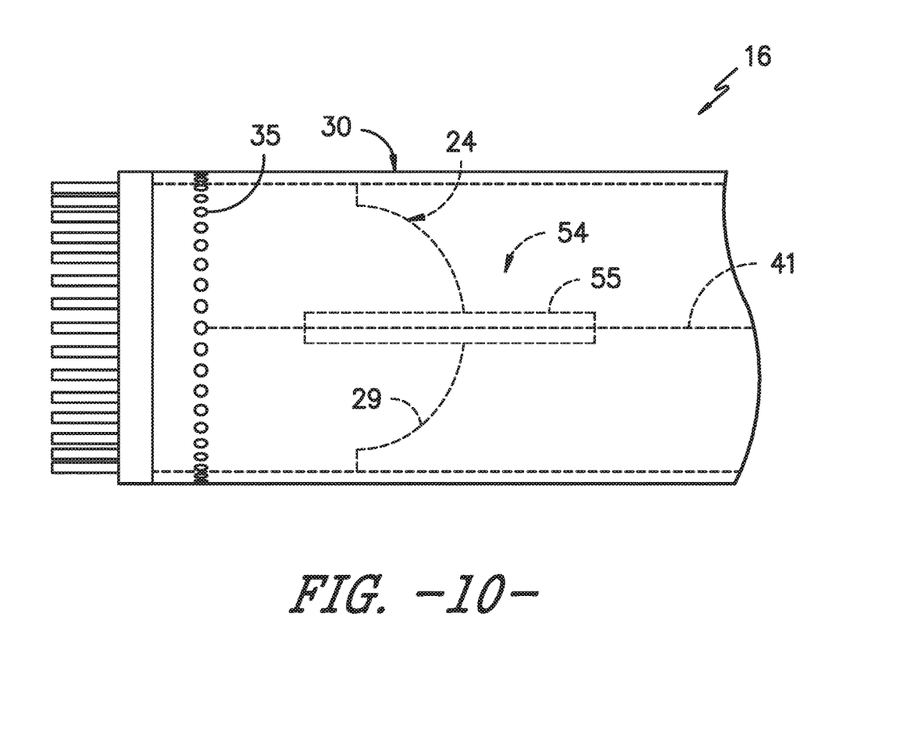
FIG. 10 illustrates a side view of one embodiment of a blade root of a rotor blade, particularly illustrating a conduit assembly routing a conductor within the blade root according to the present disclosure.

Referring generally to FIGS. 6-10, various figures illustrating a conduit assembly 54 for routing the conductor 41 away from conductive rotor blade components according to the present disclosure are illustrated. More specifically, as mentioned, the conduit assembly 54 is configured to route the conductor 41 from a first blade location away from any conductive rotor blade components to a second blade location. FIG. 6 illustrates a side view of one embodiment of the blade root 30 of the rotor blade 16 with the conduit assembly 54 configured therein. FIG. 7 illustrates a top view of the embodiment of FIG. 6. FIG. 8 illustrates a cross-sectional view of the embodiment of FIG. 7. FIG. 9 illustrates an internal view of one embodiment of the rotor blade 16 having a conduit assembly 54 configured at a span-wise location thereof. FIG. 10 illustrates another side view of one embodiment of the blade root 30 of the rotor blade 16 with the conduit assembly 54 having the conductor 41 configured therein.

In general, the conduit assembly 54 is configured to route the conductor 41 from a location within the rotor blade 16 to a grounding system (e.g. via barrel nut 35 of FIG. 10 or any other suitable conductor) so as to conduct lightning strikes to ground while also maintaining a desired distance away from other conductive rotor blade components (e.g. carbon spar caps 20, 22). Thus, the conduit assembly 54 may be located at any location within the internal cavity 38 of the rotor blade 16. For example, as shown in FIGS. 6-8 and 10, the conduit assembly 54 is located near in the blade root 30 portion of the rotor blade 16. More specifically, as particularly shown in FIGS. 8 and 10, the conductor 41 runs along a middle portion of the shear web 24 from the blade tip 32 towards the blade root 30 until the shear web 24 ends at a location near the blade root 30 (i.e. shear web edge 29). In such embodiments, the conduit assembly 54 can be installed at a predetermined location at the edge 29 of the shear web 24 near the blade root 30 as shown. Thus, the conduit assembly 54 may be configured with the edge 29 of the shear web 24 and may extend to one of the internal surfaces near the root 30. At such a location, the conduit assembly 54 is configured to route the conductor 41 to a blade location that maximizes a distance between the conductor 41 and surrounding conductive rotor blade components, e.g. the spar caps 20, 22.

More specifically, as shown in FIG. 8, the opposing spar caps 20, 22 are located at approximately 0 degrees and 180 degrees. Thus, the blade location for the conduit assembly 54 may range from about chord-wise 45 degrees to about 135 degrees away from the opposing spar caps 20, 22 near the blade root section. In rotor blades 16 containing only one spar cap, the blade location for the conduit assembly 54 may range from about chord-wise 45 degrees to about 180 degrees away from the single spar cap. Alternatively, as shown in FIG. 9, the conduit assembly 54 can be located at a span-wise location of the rotor blade 16 closer to the blade tip 32.

Referring back to FIG. 7, in certain embodiments, the conduit assembly 54 may include one or more conduit members 55 configured to receive and route the conductor 41. For example, as shown, the conduit members 55 may include any one of or combination of the following: a single tube or pipe having one or more straight or bent sections, one or more straight tubes or pipes, one or more bent or angled tubes (e.g. 45-degree or 90-degree elbows), one or more cover members, one or more couplings, or any other suitable conduit or channel known in the art. More specifically, as shown in the illustrated embodiment, the conduit assembly 54 includes three straight tubes, two bent or angled tubes, and one flexible coupling. Thus, the conduit assembly 54 may include any suitable number of conduit members 55.

For example, in the illustrated embodiment, the conduit assembly includes seven conduit members 55. In further embodiments, the conduit assembly 54 may include more than seven or less than seven conduit members 55. As such, the separate conduit members 55 can be easily arranged within the rotor blade 16 so as to route the conductor 41 to a desired location away from any conductive rotor blade components. In addition, the conduit members 55 may be constructed of any suitable non-conductive material, including but not limited to polyvinyl chloride (PVC), polyethylene, polystyrene, polycarbonate, polyester, polypropylene, or similar or any combinations thereof.

In addition, the conduit assembly 54 may be attached within the rotor blade 16 using any suitable means. For example, the conduit assembly 54 may be attached or secured within the rotor blade 16 via a bonding material. More specifically, the bonding material may be configured atop the conduit assembly 54 and attached to an internal surface of the pressure or suction sides 34, 36 of the rotor blade 16. In various embodiments, the bonding material may include at least one of a laminate composite material, such as a carbon fiber reinforced laminate composite or a glass fiber reinforced laminate composite, an adhesive, or similar.

Figure 11:
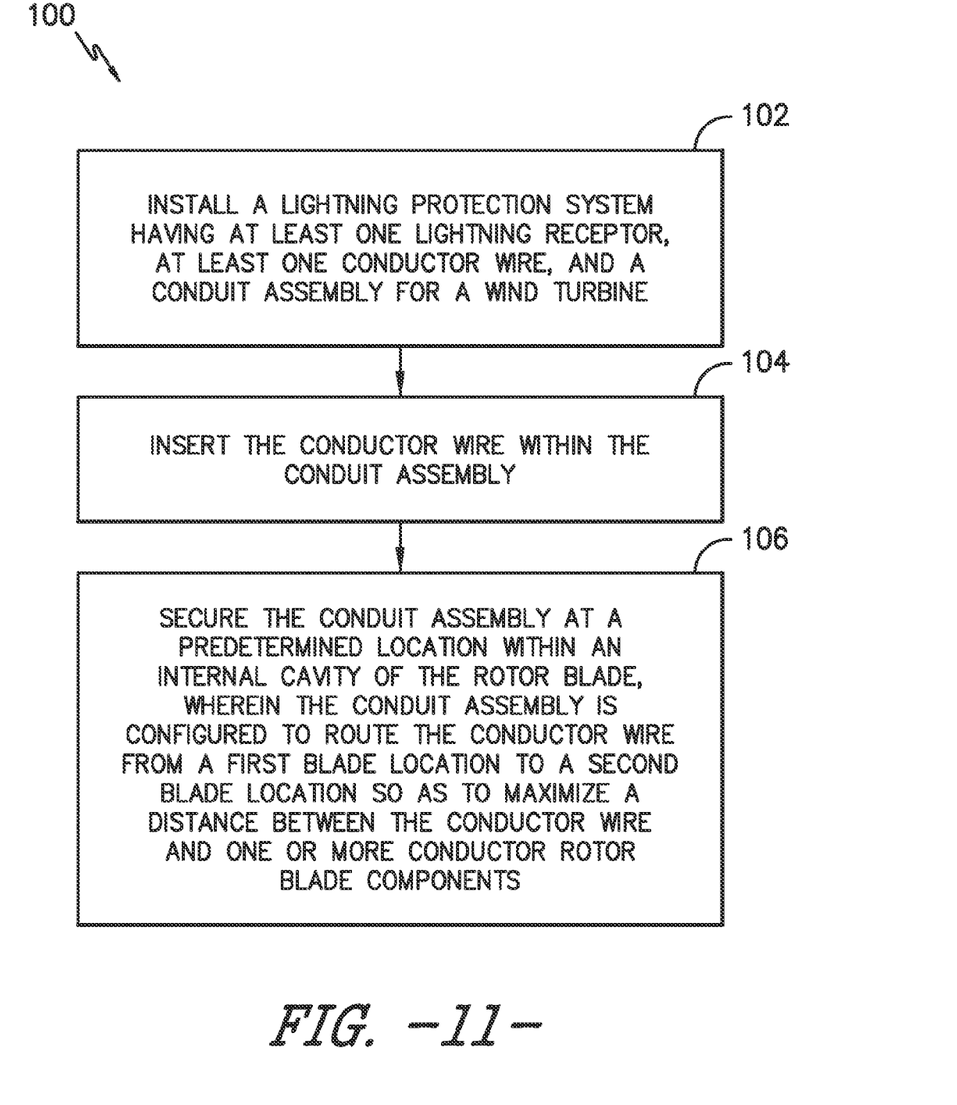
FIG. 11 illustrates a flow diagram of one embodiment of a method for reducing electrical arcs caused by lightning strikes in a rotor blade of a wind turbine according to the present disclosure.

Referring now to FIG. 11, a flow diagram of a method 100 for reducing electrical arcs caused by lightning strikes in a rotor blade of a wind turbine is illustrated. As shown at 102, the method 100 includes installing a lightning protection system having at least one lightning receptor, at least one conductor, and a conduit assembly for the wind turbine. At 104, the method 100 includes inserting the conductor within the conduit assembly. At 106, the method 100 includes securing the conduit assembly at a predetermined location within an internal cavity of the rotor blade. Thus, the conduit assembly is configured to route the conductor from a first blade location to a second blade location so as to maximize a distance between the conductor and one or more conductive rotor blade components, thereby reducing electrical arcs caused by lightning strikes in the rotor blade.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A wind turbine rotor blade, comprising:
   a root, a tip, and a pressure side and a suction side extending between said tip and said root, said pressure side and said suction side defining an internal cavity;
   at least one spar cap engaged with an internal surface of either said pressure side or said suction side;
   at least one shear web secured to the spar cap, the shear web terminating at an edge near said root;
   at least one conductor cable connecting one or more lightning receptors so as to form a conductive circuit, wherein a portion of the conductor cable extends in a span-wise direction along the shear web; and,
   a conduit assembly external to the conductor cable and extending from the shear web to one of the internal surfaces of said pressure and suction sides, the conduit assembly comprising a plurality of conduit members, the plurality of conduit members comprising one or more straight tubes and one or more bent tubes disposed between an end of the shear web and the root within the internal cavity, wherein each of the conduit members is constructed of a material that maintains its shape so as to route the conductor cable from the shear web to a blade location that maximizes a distance between the conductor cable and said spar cap, the conduit assembly being secured to the edge of the shear web and extending to one of the internal surfaces of said pressure and suction sides at the root.

2. The wind turbine rotor blade of claim 1, wherein the blade location ranges from about chord-wise 45 degrees to about 180 degrees away from the at least one spar cap.

3. The wind turbine rotor blade of claim 1, further comprising opposing spar caps, the at least one shear web extending between said opposing spar caps.

4. The wind turbine rotor blade of claim 1, wherein the conduit assembly further comprises one or more couplings.

5. The wind turbine rotor blade of claim 4, wherein the conduit members are constructed of any one of or combination of the following materials: polyvinyl chloride (PVC), polyethylene, polystyrene, polycarbonate, polyester, or polypropylene.

6. The wind turbine rotor blade of claim 1, further comprising a bonding material configured to secure the conduit assembly to at least one of the shear web or one of the internal surfaces of said pressure and suction sides.

7. The wind turbine rotor blade of claim 6, wherein the bonding material further comprises at least one of a laminate composite material or an adhesive.

8. The wind turbine rotor blade of claim 7, wherein the laminate composite material comprises at least one of a carbon fiber reinforced laminate composite or a glass fiber reinforced laminate composite.

9. The wind turbine rotor blade of claim 1, wherein the conductive circuit further comprises terminal ends that extend through said root and connect to a grounding system.

10. A system for reducing electrical arcs caused by lightning strikes in a rotor blade of a wind turbine, the rotor blade having a lightning protection system with at least one lightning receptor connected to at least one conductor cable, the system comprising:
   a conduit assembly comprising a plurality of conduit members, the plurality of conduit members comprising one or more straight tubes and one or more bent tubes disposed between an end of a shear web and a blade root, wherein the plurality of conduit members are configured for securing within an internal cavity of the rotor blade, the plurality of conduit members constructed of a material that maintains its shape so as to route the conductor cable of the lightning protection system from a first blade location along the shear web of the rotor blade to a second blade location on one of the internal surfaces of a pressure or suction side of the rotor blade at the blade root so as to maximize a distance between the conductor cable and one or more conductive rotor blade components.

11. The system of claim 10, wherein the one or more conductive rotor blade components comprise at least one spar cap.

12. The system of claim 10, wherein the second blade location ranges from about chord-wise 45 degrees to about 180 degrees away from the first blade location.

13. The system of claim 10, wherein the conduit assembly further comprises one or more couplings.

14. The system of claim 10, wherein the conduit members are constructed of any one of or combination of the following materials: polyvinyl chloride (PVC), polyethylene, polystyrene, polycarbonate, polyester, or polypropylene.

15. A method for reducing electrical arcs caused by lightning strikes in a rotor blade of a wind turbine, the method comprising:
   installing a lightning protection system for the wind turbine, the lightning protection system having at least one lightning receptor, at least one conductor cable, and a conduit assembly, the conduit assembly comprising a plurality of conduit members, the plurality of conduit members comprising one or more straight tubes and one or more bent tubes installed between an end of a shear web and a blade root within an internal cavity of the rotor blade;
   inserting the conductor cable within each of the conduit members of the conduit assembly; and,
   securing the conduit assembly at an edge of a shear web within an internal cavity of the rotor blade, the conduit assembly constructed of a material that maintains its shape so as to route the conductor cable from a first blade location along a shear web of the rotor blade to a second blade location on one of the internal surfaces of a pressure or suction side of the rotor blade so as to maximize a distance between the conductor cable and one or more conductive rotor blade components.

16. The method of claim 15, wherein the edge of the shear web is near the blade root of the rotor blade.

17. The method of claim 15, wherein the one or more conductive rotor blade components comprise one or more spar caps, and wherein the distance between the first blade location and the second blade location ranges from about chord-wise 45 degrees to about 180 degrees.

18. The method of claim 15, wherein securing the conduit assembly at the predetermined location within the internal cavity of the rotor blade farther comprises securing one or more ends of the conduit assembly via a bonding material, wherein the bonding material comprises at least one of a laminate composite material or an adhesive.

* * * * *